United States Patent
Sanvido

(10) Patent No.: US 8,060,694 B2
(45) Date of Patent: Nov. 15, 2011

(54) TECHNIQUES FOR STORING SYSTEM IMAGES IN SLICES ON DATA STORAGE DEVICES

(75) Inventor: Marco Sanvido, Belmont, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 548 days.

(21) Appl. No.: 11/847,948

(22) Filed: Aug. 30, 2007

(65) Prior Publication Data

US 2009/0063788 A1  Mar. 5, 2009

(51) Int. Cl.
*G06F 12/02* (2006.01)
(52) U.S. Cl. .............. 711/112; 711/173; 711/E12.007
(58) Field of Classification Search .......................... None
See application file for complete search history.

(56) References Cited

U.S. PATENT DOCUMENTS

| | | | | |
|---|---|---|---|---|
| 3,689,891 A * | 9/1972 | Kril | .............................. | 711/112 |
| 5,469,573 A * | 11/1995 | McGill et al. | .................. | 717/127 |
| 6,771,843 B1 * | 8/2004 | Huber et al. | .................... | 382/305 |
| 6,931,503 B1 * | 8/2005 | Robb et al. | ..................... | 711/163 |
| 2004/0117572 A1 * | 6/2004 | Welsh et al. | ................... | 711/162 |
| 2005/0066118 A1 * | 3/2005 | Perry et al. | ..................... | 711/112 |
| 2005/0289533 A1 * | 12/2005 | Wang et al. | ..................... | 717/168 |
| 2006/0048039 A1 * | 3/2006 | Barrett et al. | .................. | 714/799 |
| 2006/0085666 A1 * | 4/2006 | Stakutis et al. | ................... | 714/2 |

FOREIGN PATENT DOCUMENTS

EP  800135 A1 * 10/1997

OTHER PUBLICATIONS

Sun Microsystems. "Sun StorEdge Instant Image Software Architecture Guide." Dec. 2001. Sun Microsystems.*
André Dumouchelle and Ahmad Ali. "Comparing RAID Implementation Methods." Aug. 2003. Dell.*
Microsoft Press. Microsoft Computer Dictionary. May 2002. Microsoft Press. 5th ed. Boot partition definition.*
Jacob Taylor Wires, "Secure File System Versioning at the Block Level," The University of British Columbia, Sep. 2006, pp. 1-92.
Mark Russinovich, "Windows Administration: Inside the Windows Vista Kernel: Part 3," TechNet Magazine, Apr. 2007, pp. 1-7.

* cited by examiner

*Primary Examiner* — Reginald Bragdon
*Assistant Examiner* — Nathan Sadler
(74) *Attorney, Agent, or Firm* — Steven J. Cahill

(57) ABSTRACT

A data storage device has a data storage medium. A data storage capacity of the data storage device is divided into slices. Each slice has a set of sectors. Data storage device firmware is configured to store copies of a system image in the slices on the data storage device. Each of the slices stores a different copy of the system image.

20 Claims, 5 Drawing Sheets

TECHNIQUES FOR STORING SYSTEM IMAGES IN SLICES ON DATA STORAGE DEVICES

BACKGROUND OF THE INVENTION

The present invention relates to data storage devices, and more particularly, to techniques for storing system images in slices on data storage devices.

Currently, a significant amount of time is required to perform a complete backup of a full hard disk drive. The increasing data storage capacity of hard disk drives slows down the backup process. For example, backing up a 160 gigabyte (GB) hard disk drive at 50 MB/second that is only 50% full takes about 30 minutes.

Restoring a previous system image on a hard disk drive takes even more time than performing a backup. If the image was in a compressed format, the image has to be copied back to the hard disk drive. Often, the hard disk drive has to be physically swapped with the restored version. In some cases, the restoration effort may be required to recover only a single file.

A computer system is typically blocked when a full hard disk drive image backup is occurring. Otherwise, an inconsistent state may be saved in the backup image. Non-blocking backups operate at the file level in order to lock every single file for backup, but they may not be enough to guarantee system consistency.

Other issues with backups relate to storing multiple versions and security. The management of multiple backup copies can be cumbersome and error prone. Also, each backup copy should have the same security-level of the original image in terms of access, control, confidentiality, and integrity.

BRIEF SUMMARY OF THE INVENTION

Some embodiments of the present invention comprise a data storage device that has at least one data storage medium. A data storage capacity of the data storage device is divided into slices. Each slice has a set of sectors. Data storage device firmware is configured to store copies of a system image in the slices on the data storage device. Each of the slices stores a different copy of the system image.

Various objects, features, and advantages of the present invention will become apparent upon consideration of the following detailed description and the accompanying drawings.

DETAILED DESCRIPTION OF THE INVENTION

Figure 1:
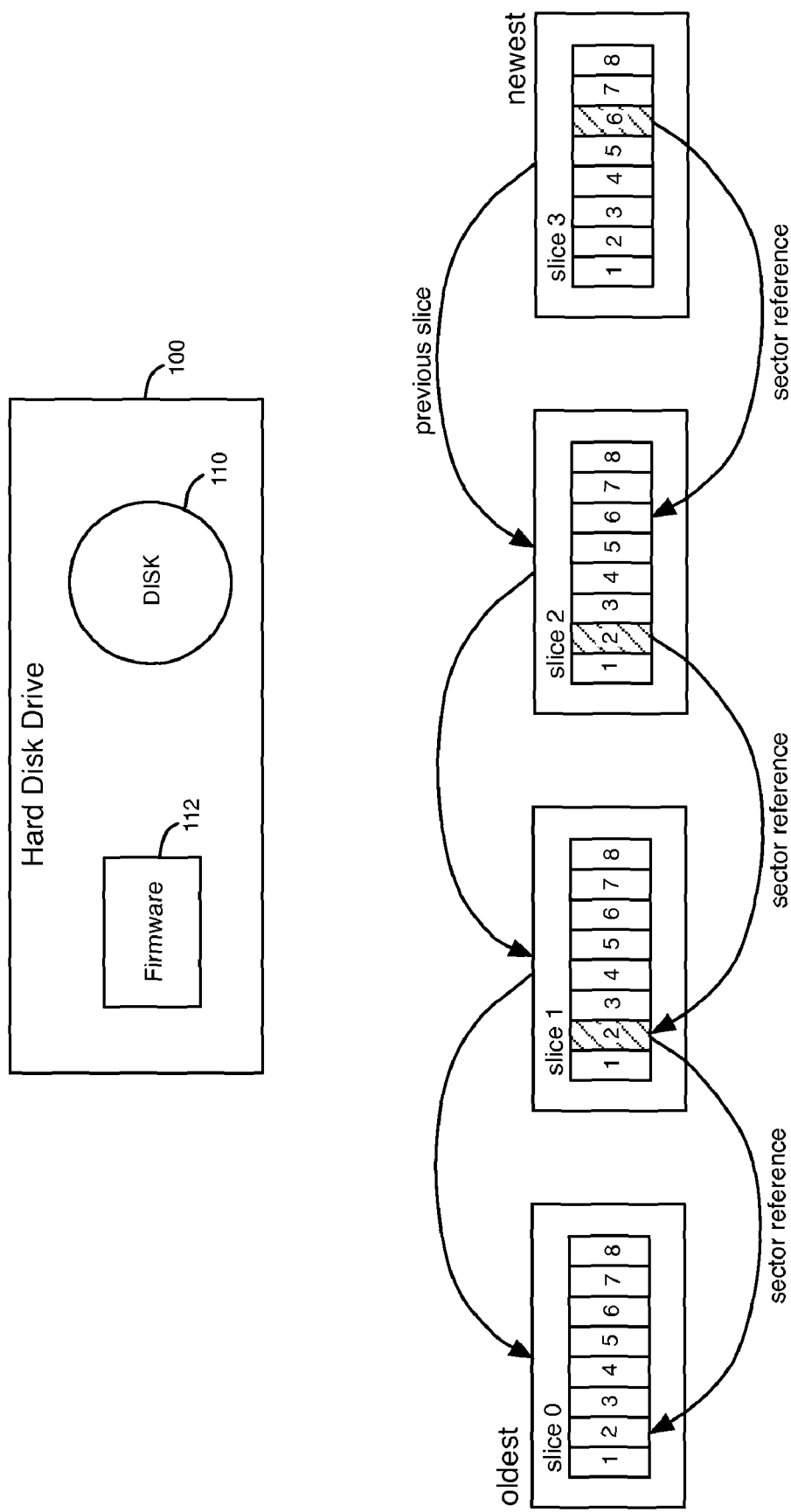
FIG. 1 illustrates a first example of a hard disk drive that utilizes a slicing technique to generate multiple copies of a system image, according to an embodiment of the present invention.

FIG. 1 illustrates a first example of a hard disk drive that utilizes a slicing technique to generate backups or snapshots of a system image, according to an embodiment of the present invention. Hard disk drive 100 includes a magnetic hard disk 110, which is a data storage medium. Hard disk drive 100 also includes firmware 112. Hard disk 110 has numerous concentric data tracks for storing data. Each data track is divided into multiple sectors. Firmware 112 is configured to implement various embodiments of the present invention.

Although many embodiments of the present invention are described herein in the context of magnetic hard disk drives, it should be understood that the techniques of the present invention can be applied to other types of data storage devices, such as optical disk drives.

According to some embodiments of the present invention, the sectors on a hard disk can be grouped into slices. A hard disk drive can contain any desired number of slices depending on the storage capacity of the drive and the size of each slice. According to some embodiments of the present invention, slices on a hard disk drive store backup copies or snapshots of an entire system image. A system image typically includes all of the data files and software needed to operate a particular computer system as intended (e.g., data files, operating system, software applications, etc.).

According to an embodiment of the present invention, multiple copies of a system image can be stored on a single hard disk drive using slices. For example, multiple backup copies or snapshots of a system image can be embedded into a single hard disk drive. Each backup copy or snapshot is stored in a different slice on the single hard disk drive. This slicing technique makes the backups and/or the snapshots portable and transparent to the system that uses them.

Four examples of slices are shown in FIG. 1. The slices are referred to as slice 0, slice 1, slice 2, and slice 3. Although 4 slices are shown in FIG. 1, a data storage device can have any suitable number of slices. Each slice has the same amount of data storage capacity, and each slice has the same number of sectors for storing data. Although the slices shown in FIG. 1 each have eight sectors, a slice in a hard disk drive typically has thousands or millions of sectors.

The sectors in each slice have the same range of logic block addresses (LBAs). For example, the sectors in each of slices 0-3 in FIG. 1 have LBAs that are numbered 1-8. Slices that have 1000 sectors can, for example, have LBAs that are numbered 0-999 or 1-1000.

The slices are ordered temporally. The oldest slice stores the oldest data for the hard disk drive, and the youngest slice stores the newest data for the hard disk drive. In the example of FIG. 1, slice 3 stores the current version of the system image. Therefore, slice 3 stores the newest data. Slices 0, 1, and 2 store backup copies (or older snapshots) of the system image. Slice 2 stores the most recent backup copy of the system image. Slice 1 stores the second most recent backup of the system image. Slice 0 stores the third most recent backup of the system image, and is therefore the slice in FIG. 1 that stores the oldest data.

When a slice is active, the hard disk drive's read and write operations are mapped to the active slice. Typically, only one of the slices is active at any given point in time.

The content of each slice is copy-on-write. Copy-on-write refers to a sector in a slice being in one of two states, either clean or dirty. If data has never been written to a sector, the sector is designated as clean (i.e., empty). After data has been written to a sector in the active slice, the sector is designated as dirty. Thus, a dirty sector indicates that data has been written to that sector.

Each time that firmware 112 creates a new slice on a hard disk drive, the sectors in the newly created slice are marked as clean (i.e., empty). Each sector remains clean until data has been written to that sector in the currently active slice. After data has been written to a sector, the sector is marked as dirty.

Firmware 112 gives each clean sector in a newly created slice a reference to a sector in a previously created slice that has the same logical block address (LBA). In FIG. 1, the clean sectors in slice 3 contain references to the sectors in slice 2 that have the same logical block addresses. The clean sectors in slice 2 contain references to the sectors in slice 1 that have the same logical block addresses. The clean sectors in slice 1 contain references to the sectors in slice 0 that have the same logical block addresses. For example, sector 6 in slice 3 refers to sector 6 in slice 2, sector 2 in slice 2 refers to sector 2 in slice 1, and sector 2 in slice 1 refers to sector 2 in slice 0. Each of the references can, for example, be stored as a pointer within the referencing sector. The sectors in the slice that stores the oldest data (e.g., slice 0 in FIG. 1) do not contain references to any previously created slices, i.e., all its sectors are dirty.

The content of a clean sector is the same as the content of a sector in a previously created slice that has the same logical block address (LBA). A clean sector contains an explicit or implicit reference to the sector in the previously created slice that has the same LBA. In the figures, the diagonal lines indicate clean sectors. The hard disk drive re-directs each read command that attempts to access a clean sector in the currently active slice to a previously created slice where the most recently created data is stored in a sector having the requested LBA.

Because the sectors in a newly created slice are initially clean, the hard disk drive uses the sector references described above to re-direct read commands for data from the newly created slice to the previously created slice that stores the second most recent copy of the system image. The hard disk drive accesses sectors in the previously created slice that have the same LBAs as the LBAs requested in the read commands. If the any of the sectors in the previously created slice that have the requested LBAs are also clean, the hard disk drive uses the sector references to access sectors having the requested LBAs in the third most recently created slice. The hard disk drive continues to look up data in progressively older slices until dirty sectors are found for all of the requested LBAs.

Figure 2:
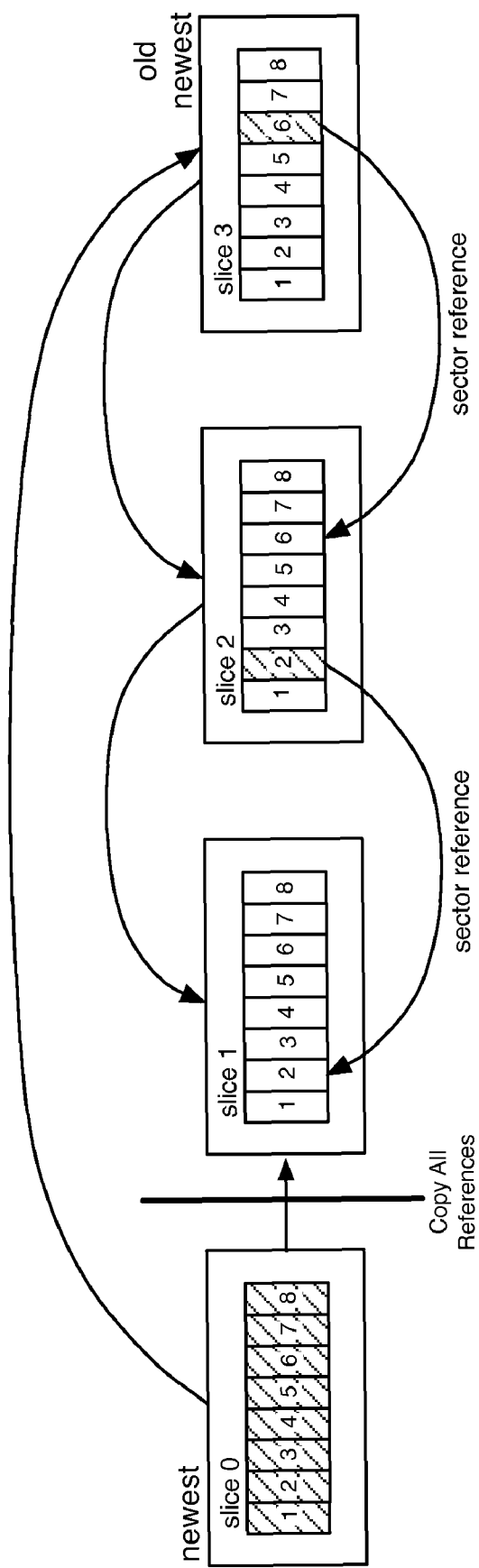
FIG. 2 illustrates an example of how a slice on a hard disk drive that contains the oldest data can be erased and used as a newly created slice, according to an embodiment of the present invention.

FIG. 2 illustrates an example of how a slice on a hard disk drive that contains the oldest data can be erased and used as a newly created slice, according to an embodiment of the present invention. In FIG. 1, slice 0 stores the oldest data. In FIG. 2, slices 0-3 are rotated by one, and slice 0 is converted into the newest slice for storing current updates to the system data.

Slice 3 becomes the old newest slice that stores the most recent backup copy of the system data. The data in slice 0 is copied into slice 1 for all sectors in slice 1 that are clean and that refer to slice 0. Then, all of the sectors in slice 0 are marked as clean. Finally, the newest slice (i.e., slice 0) is marked as the currently active slice. After slice 0 becomes the active slice, all read and write commands to the hard disk drive access slice 0 or a previously created slice for read accesses to sectors in slice 0 that are clean.

In order to recover an old backup or snapshot of the system data, one of the old slices can simply be activated in read-only mode, and then the data in that slice can be read. In order to be able to write to a slice that contains an old backup or snapshot of the system data, all of the sector references to that slice are updated to reflect the changed data. The references to the slice can be updated, for example, by copying the sectors in that slice to the clean sectors in other slices that reference those sectors.

Alternatively, all of the sector references can be updated using an update-on-write. If a write is performed to a sector that is referenced by another slice, the sector in the referencing slice is updated first, and then the write operation is performed.

Optionally, to reduce the referencing overhead (i.e., for copy-on-write and sector reads), the sectors referenced by a new slice can be copied from the old slice to the new slice, while the hard disk drive is idle. Alternatively, the sectors references by a new slice are moved to the new slice, and a forward reference is stored in the old slice.

Storing the content of a slice as copy-on-write can allow for a new backup to be started very quickly. The only overhead needed is the copy of the references from the oldest slice to the previous slice. Although, the references can be copied ahead of time to reduce latency. Alternatively, the number of references can be reduced by adding a third sector state referred to as clean-with-old-data, i.e., the sector is copied only on a write to the sector.

Storing images in slices on a data storage device can also provide an extremely fast technique for restoring a backup by activating one of the previously created slices in read-only mode without incurring any overhead. Although, if write mode is needed, then a limited amount of overhead is incurred as a result of the update-on-write operations.

The access-protection can be the same for all of the slices that are created to store a system image on a data storage device. Moreover, each slice can have equivalent confidentiality, security, and integrity levels, if the confidentiality, security, and integrity levels are implemented by the storage device. For example, the data stored in each slice can have the same level of encryption.

Figure 3:
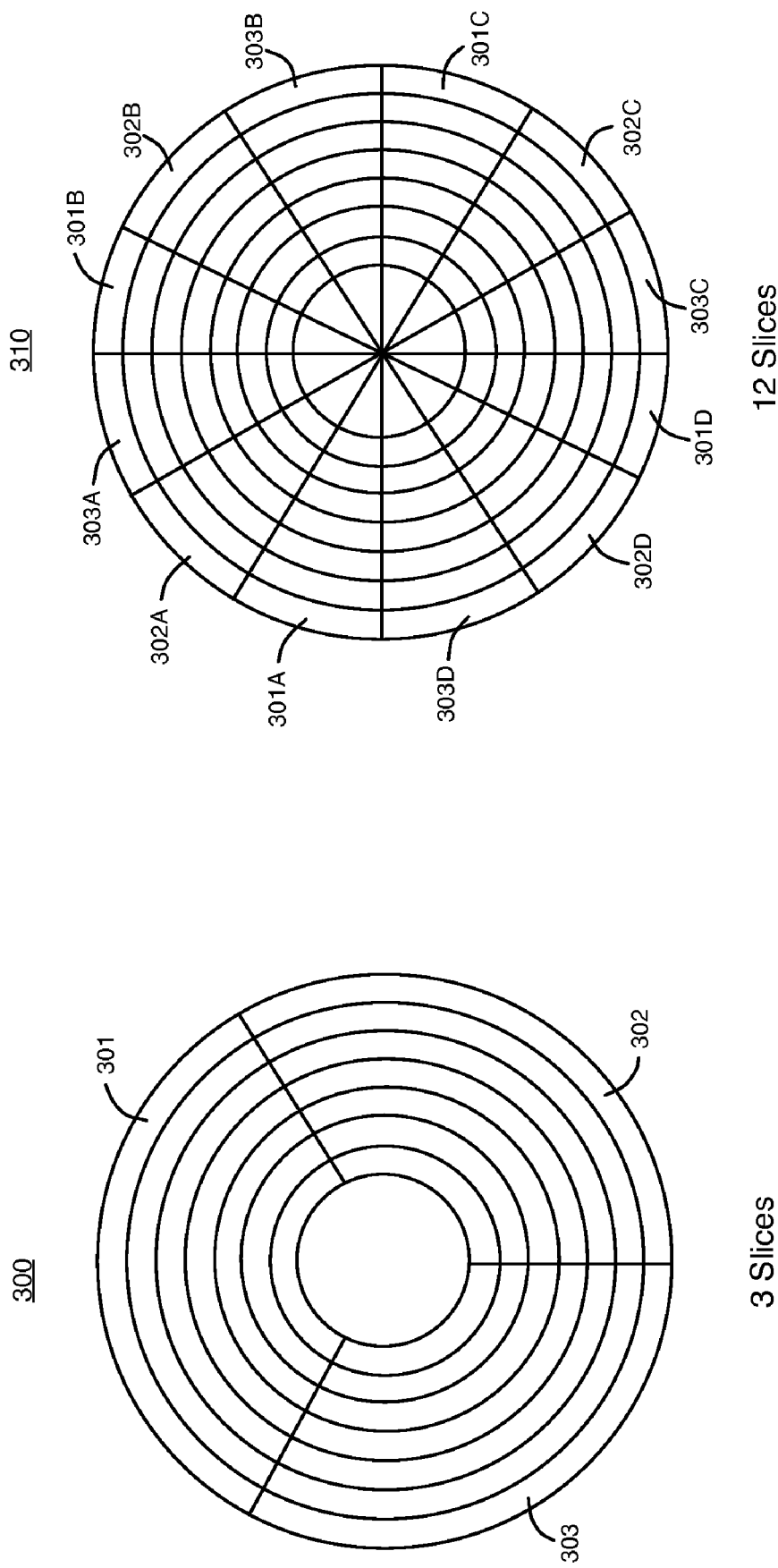
FIG. 3 illustrates two examples of how a surface of a hard disk platter can be partitioned into multiple slices, according to particular embodiments of the present invention.

FIG. 3 illustrates two examples of how a surface of a hard disk platter can be partitioned into multiple slices, according to particular embodiments of the present invention. Each concentric data track on the surface of a hard disk platter can be divided into any desired number of slices (N). However, this solution increases the rotational latency (L) time by $((N-1) \times L/N)$, but it has the same transfer and seek times as other types of hard drives.

For example, one surface of hard disk platter 300 in FIG. 3 is divided into three equal slices 301, 302, and 303. Each slice 301-303 contains the same amount of data storage capacity and the same number of sectors. One third of each concentric track of hard disk platter 300 lies within one of the slices 301-303.

According to another embodiment, each of the slices that are stored on the surface of a hard disk platter can be divided into multiple sub-parts (i.e., sub-slices). The sub-slices are alternated along the tracks of the disk surface.

For example, one surface of hard disk platter 310 in FIG. 3 is divided into 12 equal sub-slices 301A, 302A, 303A, 301B, 302B, 303B, 301C, 302C, 303C, 301D, 302D, and 303D. The surface of platter 310 shown in FIG. 3 has three slices 301-303. Sub-slices 301A, 301B, 301C, and 301D form a first slice 301. Sub-slices 302A, 302B, 302C, and 302D form a second slice 302. Sub-slices 303A, 303B, 303C, and 303D form a third slice 303.

Each slice on the surface of platter 310 has four sub-slices. The 12 sub-slices are placed on the surface of platter 310 in an alternating manner, as shown in FIG. 3, to reduce the rotational latency of the hard disk drive.

The sub-slices within each of the four quadrants of disk platter surface 310 can be assigned to the same range of logical block addresses. For example, all three of sub-slices 301A, 302A, and 303A can have LBAs of 0-999. All three of sub-slices 301B, 302B, and 303B can have LBAs of 1000-1999. All three of sub-slices 301C, 302C, and 303C can have LBAs of 2000-2999. All three of sub-slices 301D, 302D, and 303D can have LBAs of 3000-3999.

Figure 4:
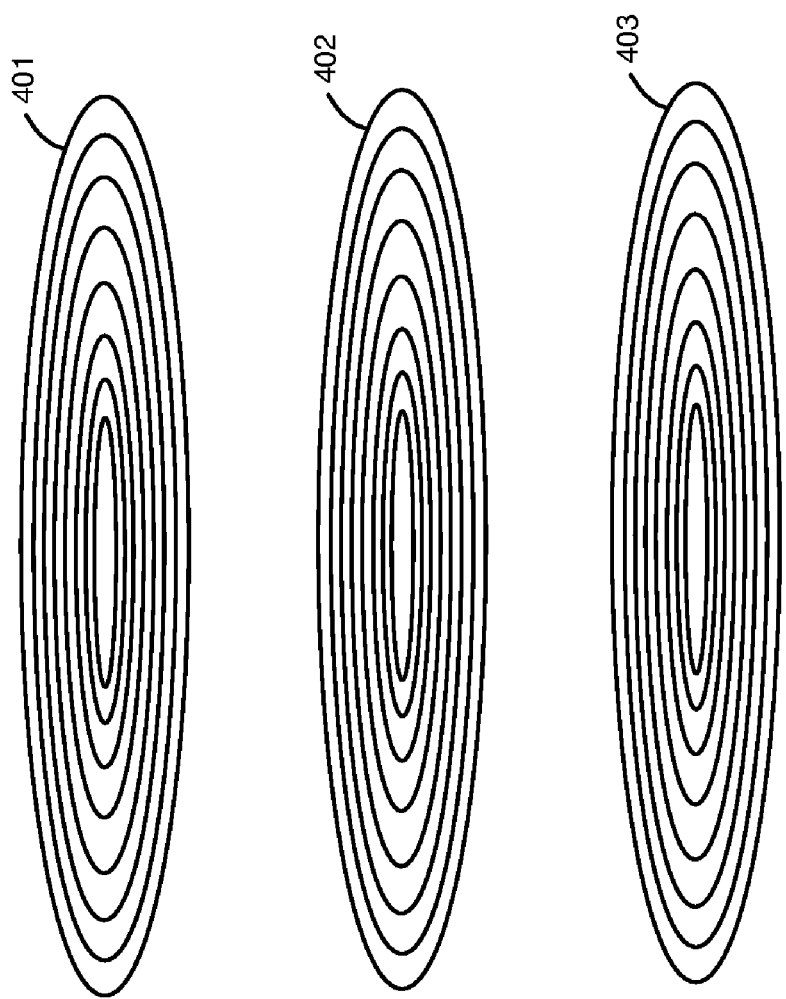
FIG. 4 illustrates an example of how multiple hard disk platters can be partitioned into slices, according to another embodiment of the present invention.

FIG. 4 illustrates an example of how multiple hard disk platters can be partitioned into slices, according to another embodiment of the present invention. FIG. 4 illustrates three hard disk platter surfaces 401-403. Each hard disk platter surface stores one complete slice. Hard disk platter surface 401 stores a first slice. Hard disk platter surface 402 stores a second slice. Hard disk platter surface 403 stores a third slice. In this embodiment, the number of slices on a hard disk drive is a fixed number that is determined by the physical number of disk platter surfaces on the hard disk drive.

The embodiment of FIG. 4 does not add any rotational latency, seek latency, or transfer time. The overhead incurred by a copy-on-write operation is defined by the head-switch latency. The head-switch latency is the time for the read/write head of the hard disk drive to switch between platter surfaces.

Figure 5:
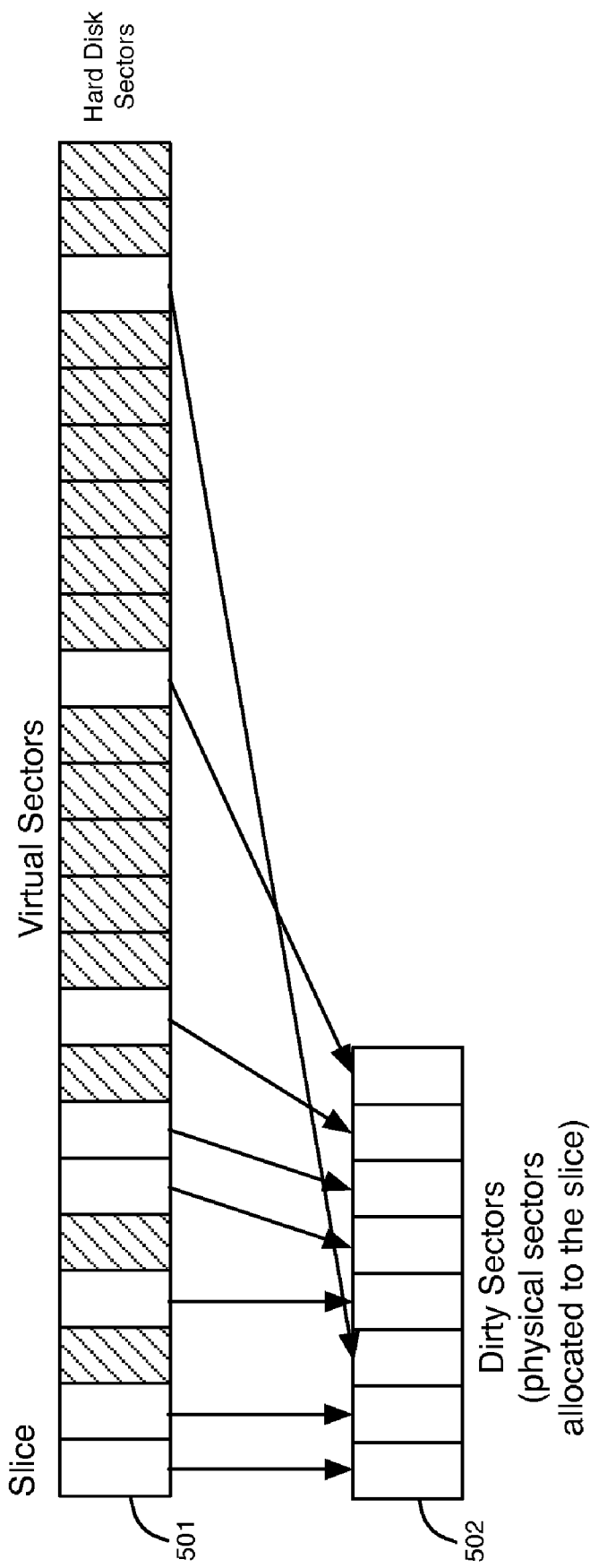
FIG. 5 illustrates an example of how sectors in a slice can be allocated dynamically, according to an embodiment of the present invention.

FIG. 5 illustrates an example of how sectors in a slice can be allocated dynamically, according to an embodiment of the present invention. In this embodiment, the sectors in a slice are not allocated statically, but assigned dynamically to the slice. More precisely, clean sectors in a slice are not allocated to physical addresses in the slice. Instead, a sector in a slice is allocated to a physical address in the data storage device when the sector is marked as dirty, as part of the copy-on-write operation. In the embodiments of FIGS. 3 and 4, both the clean and dirty sectors in a slice are allocated to physical addresses on the data storage device when the slice is created. Physical addresses are pointers to physical sectors on a hard disk drive or other data storage device, e.g., cylinder head sector numbers (CHS tuple). Each sector on a hard disk is assigned to a unique physical address.

Referring to FIG. 5, a slice 501 contains several sectors, including clean sectors and dirty sectors. The clean sectors have diagonal lines in FIG. 5. Only the dirty sectors 502 in slice 501 are allocated to physical addresses in the hard disk drive. The clean sectors in slice 501 are dynamically assigned to physical addresses in the hard disk drive when the clean sectors are marked as dirty. Because this embodiment allocates sectors to a slice dynamically, the total storage space requirement of the slice is reduced.

For this embodiment, a virtual sector table is used for each slice. The virtual sector table maps virtual sectors to physical sectors in a slice that have physical addresses. The mapping between virtual and physical sectors is stored in the virtual sector table when data is written to those sectors in the active slice.

In this embodiment, the addresses of the sectors may not be sequential on the data storage device. Although, a background, idle-time serializer can be used to assign the dirty sectors to addresses that are as sequential as possible. Because slices that store old data have multiple similar sectors (delta), this embodiment allows the total number of sectors is used in a slice to be reduced.

Although some embodiments of the present invention do not provide a physical separation of backup images that are stored on a single hard disk drive, a slice can be copied to an external backup storage device in the background or during idle time if a physically separated backup is required.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, variations, and substitutions are possible in light of the above teachings, without departing from the scope of the present invention.

The invention claimed is:

1. A data storage device comprising:
at least one data storage medium, wherein a data storage capacity of the data storage device is divided into slices, and each of the slices has sectors; and
data storage device firmware configured to store copies of a system image in the slices on the data storage device, wherein each of the slices stores a different copy of the system image, wherein each of the sectors in the slices is a clean sector if the sector is empty and a dirty sector after data has been written to the sector, and
wherein each clean sector in a first one of the slices has a reference to a sector in a previously created one of the slices that the data storage device uses to access the sector in the previously created one of the slices in response to a read command requesting to access the referencing clean sector.

2. The data storage device defined in claim 1 wherein each reference to a sector in the previously created one of the slices is updated to reflect new data in order to write the new data to the sector in the previously created one of the slices.

3. The data storage device defined in claim 1 wherein after the data storage device firmware creates a new one of the slices, each sector in the new one of the slices is marked as a clean sector that is empty until data is written to that sector.

4. The data storage device defined in claim 1 wherein the data storage device firmware dynamically assigns each of the sectors in the slices to a physical address in the data storage device when data is written to that sector.

5. The data storage device defined in claim 4 wherein the data storage device firmware attempts to make physical addresses of the sectors in each of the slices sequential.

6. The data storage device defined in claim 1 wherein the data storage capacity of the data storage device is divided into at least three slices, and wherein clean sectors that are empty in the previously created one of the slices contain references to sectors in a third one of the slices.

7. The data storage device defined in claim 1 wherein a youngest slice stores a current version of the system image, and wherein an oldest slice stores an oldest version of the system image.

8. The data storage device defined in claim 1 wherein the data storage device is a hard disk drive, wherein the data storage medium comprises at least one hard disk, wherein the hard disk drive comprises multiple platter surfaces, and wherein each of the slices is stored on one of the platter surfaces.

9. The data storage device defined in claim 1 wherein the data storage device is a hard disk drive wherein the data storage medium comprises at least one hard disk, and wherein each of the slices are sub-divided into sub-slices that are stored in an alternating manner on the at least one hard disk such that each of the sub-slices and two adjacent sub-slices are part of three different slices.

10. A data storage device that comprises code for storing a system image in slices, wherein the code is stored on a computer readable medium in the data storage device, the data storage device comprising:

at least one data storage medium;

code for dividing the data storage device into the slices, wherein each of the slices contains sectors; and code for storing copies of the system image in the slices on the data storage device, wherein each of the slices stores a different copy of the system image, wherein each of the sectors in the slices is a clean sector when the sector is empty and a dirty sector after data has been written to the sector, and wherein each clean sector in a first one of the slices has a reference to a sector in a previously created one of the slices that the data storage device uses to access the sector in the previously created one of the slices in response to a read command requesting to access the referencing clean sector.

11. The data storage device defined in claim 10 wherein the code for storing copies of the system image in the slices on the data storage device comprises code for creating a new one of the slices and marking each sector in the new one of the slices as a clean sector that is empty until data is written to that sector.

12. The data storage device defined in claim 10 wherein the code for dividing the data storage device into the slices further comprises code for dividing the data storage device into at least three of the slices, and wherein clean sectors that are empty in the previously created one of the slices contain references to sectors in a third one of the slices.

13. The data storage device defined in claim 10 further comprising:

code for dynamically assigning each of the sectors in the slices to a physical address in the data storage device when data is written to that sector.

14. The data storage device defined in claim 10 wherein the data storage device is a hard disk drive and the at least one data storage medium comprises at least one hard disk.

15. The data storage device defined in claim 14 wherein the hard disk drive comprises a platter surface that is divided into the slices.

16. The data storage device defined in claim 14 wherein the hard disk drive comprises multiple platter surfaces, and each of the slices is stored on one of the platter surfaces.

17. The data storage device defined in claim 14 wherein each of the slices are sub-divided into sub-slices that are stored in an alternating manner on the at least one hard disk such that each of the sub-slices and two adjacent sub-slices are part of three different slices.

18. A method for storing a system image in slices on a hard disk drive comprising at least one hard disk, the method comprising:

dividing the hard disk drive into the slices, wherein each of the slices has sectors; and storing copies of the system image in the slices on the hard disk drive, wherein each of the slices stores a different copy of the system image taken at different times, and wherein each of the sectors in the slices is designated as a clean sector if the sector is empty and as a dirty sector after data has been written to the sector, and wherein each clean sector in a first one of the slices has a reference to a sector in a previously created one of the slices that the hard disk drive uses to access the sector in the previously created one of the slices in response to a read command requesting to access the referencing clean sector.

19. The method defined in claim 18 wherein the hard disk drive comprises a platter surface that is divided into at least three of the slices.

20. The method defined in claim 18 wherein the hard disk drive comprises first, second, and third platter surfaces, and wherein the first one of the slices is stored on the first platter surface, the previously created one of the slices is stored on the second platter surface, and a third one of the slices is stored on the third platter surface.

* * * * *